United States Patent Office

2,783,395
Patented Feb. 26, 1957

2,783,395

ALTERNATING VOLTAGE WAVE-FORM DISTORTING CIRCUITS

Alec H. B. Walker and Kenneth G. King, London, England, assignors to Westinghouse Brake & Signal Company Limited, London, England Application June 4, 1954, Serial No. 434,625

Claims priority, application Great Britain June 23, 1953

1 Claim. (Cl. 307—106)

This invention relates to alternating voltage wave-form distorting circuits suitable for use with electro-static dust precipitators.

Apparatus commonly employed to provide the necessary energisation for dust precipitation comprises a main transformer connected to an alternating current source and feeding a rectifier and condenser network to provide a high, pulsating, direct current voltage across the terminals of the precipitator.

The operation of the precipitator is improved if a so-called saw-tooth ripple is produced in the direct current output of the rectifier and it is the object of this invention to provide a circuit which will so distort the sinusoidal voltage wave-form of the alternating current source as to produce the desired saw-tooth ripple in the rectifier output.

It is known to use a series circuit consisting of a saturable reactor and an impedance device having a linear characteristic for producing a sharply peaked wave from a sinusoidal voltage source. The present invention provides an improvement on such a circuit in that it produces a peaked wave form of given amplitude with considerably smaller losses in the circuit components.

According to the invention, a reactor having a linear characteristic and a saturable reactor are connected in series one with the other across an alternating current source, the saturable reactor being connected in series with the secondary winding of an auxiliary transformer across the primary winding of a main transformer, the primary winding of the auxiliary transformer being connected to the first mentioned source or to an alternating current source the voltage of which is in phase with that of the first mentioned source, the arrangement being such that the voltage applied to the primary winding of the main transformer is the sum of the voltage across the secondary winding of the auxiliary transformer and the voltage across the saturable reactor. The output of the main transformer is then rectified to produce a uni-directional voltage having a saw-tooth ripple component.

Figure 1:
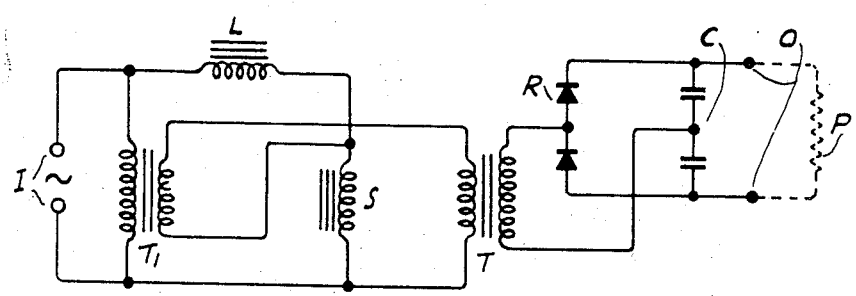
Figure 2:
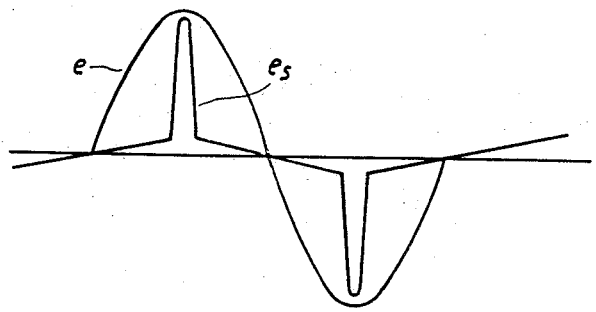
Figure 3:
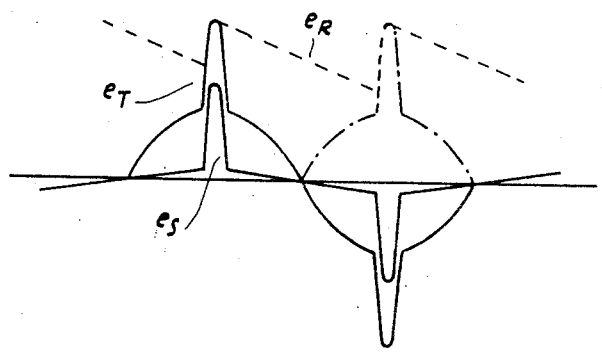

The invention is illustrated by way of example in the accompanying drawing, of which Figure 1 is a circuit diagram illustrating one form of the invention;

Figure 2 illustrates the wave-form of two of the voltages appearing across two of the circuit elements; and Figure 3 shows the sum of the two voltages of Figure 2 rectified to produce the desired saw-tooth unidirectional voltage.

Referring now to the drawing, the circuit depicted in Figure 1 comprises a reactor L having a linear characteristic connected in series with a saturable reactor S across input terminals I to which is connected an alternating current source having substantially sinusoidal voltage wave-form represented by the curve $e$ in Figure 2. The wave-form of the voltage developed across the saturable reactor S consists of a series of narrow spikes having a peak amplitude aproaching that of the sinusoidal supply voltage, as illustrated by the curve $e_s$. These spikes could be rectified directly to produce a saw-tooth unidirectional voltage, but, according to the invention a greater efficiency is obtained by adding these spikes to a sinusoidal voltage and to this end, an auxiliary transformer $T_1$ is provided having its primary winding connected across the input terminals I and its secondary winding connected in series with the reactor S across the primary winding of a main transformer T. The secondary winding of the main transformer T is connected through a suitable rectifier and condenser network, shown conventionally at R and C in Figure 1, to output terminals O to which may be connected a dust precipitator R, as indicated by the broken lines.

Figure 3 shows the wave-form of the resultant voltage $e_T$ appearing at the terminals of the secondary winding of transformer T, and also, in broken lines, the wave-form $e_R$ of this voltage after rectification by the rectifier R, which exhibits the desired saw-tooth characteristic.

It is to be noted that the rectifier and condenser arrangement to which the invention may be applied is not limited to that shown by way of example in Figure 1, and that alternative arrangements such as the well known cascade voltage doubler circuit for example, may be used.

Although the auxiliary transformer $T_1$ is shown connected across the same source of supply as the two reactors, separate sources may be used provided that their voltages are in phase with each other. For example, the input terminals I and the primary winding of the transformer $T_1$ may be connected to separate secondary windings on a common supply transformer.

It is also to be understood although the circuit has been described as a single phase arrangement, it may be arranged for polyphase operation if desired.

Having thus described our invention what we claim is:

An alternating voltage wave form distorting circuit, comprising, in combination, a reactor having a linear characteristic, a saturable reactor connected in series therewith across an alternating current source, a main transformer having a primary and a secondary winding, an auxiliary transformer having a primary winding connected across an alternating current source the voltage of which is in phase with that of said first mentioned alternating current source and a secondary winding connected in series with said saturable reactor across said primary winding of said main transformer.

References Cited in the file of this patent

UNITED STATES PATENTS

| | | |
|---|---|---|
| 1,935,460 | Schmidt | Nov. 14, 1933 |
| 1,988,294 | Blaich | Jan. 15, 1935 |
| 2,366,537 | Livingston | Jan. 2, 1945 |